United States Patent [19]
Yazolino et al.

[11] Patent Number: 5,329,370
[45] Date of Patent: Jul. 12, 1994

[54] REMOTE CONTROL SYSTEM AND METHOD FOR CABLE TELEVISION SYSTEM

[76] Inventors: Lauren F. Yazolino, 100 Meadow View Rd., Orinda, Calif. 94563; Ming S. Leung, 6540 Edgemoore Way, San Jose, Calif. 95129

[21] Appl. No.: 90,507

[22] Filed: Jul. 13, 1993

[51] Int. Cl.⁵ .............................. H04N 5/60
[52] U.S. Cl. .............. 548/734; 340/875.69; 359/146; 455/180.1
[58] Field of Search ............ 358/86, 188, 194.1; 359/142, 146; 340/825.69, 825.72; 455/180.1, 4.1, 6.2; H04N 5/60

[56] References Cited

U.S. PATENT DOCUMENTS

| | | | |
|---|---|---|---|
| 3,230,302 | 1/1966 | Bruck et al. | 358/84 |
| 4,408,348 | 10/1983 | Theriault | 455/180.1 |
| 4,598,425 | 7/1986 | Skerlos et al. | 455/180.1 |
| 4,631,601 | 12/1986 | Brugliera et al. | 359/146 |
| 4,947,244 | 8/1990 | Fenwick et al. | 358/86 |
| 5,101,499 | 3/1992 | Streck et al. | 455/4.1 |
| 5,123,046 | 6/1992 | Levine | 358/194.1 |

Primary Examiner—Mark R. Powell
Assistant Examiner—Jeffrey S. Murrell
Attorney, Agent, or Firm—Flehr, Hohbach, Test, Albritton & Herbert

[57] ABSTRACT

A cable television system provides television signals in multiple predefined television signal formats. Each television has a multi-standard receiver for receiving television signals in those predefined television signal formats. Hidden behind each television, or elsewhere out of view of the user, is a converter coupling the respective television to transmission cable. The only connection from the converter to the television is a cable connected to the television's cable or antenna input port. Each television includes a sensor for receiving wireless command signals. The television's control circuitry ingores wireless command signals not in a first defined set. The converter includes a sensor for receiving a second defined set of wireless command signals. The converter's sensor is preferably located near or on the housing of the television. The converter's controller ignores wireless command signals not in the second defined set. The converter's controller responds to wireless channel selection commands by tuning the frequency converter to a respective television channel and/or by transmitting pay-per-view requests to the controller at the head end of the system. A remote controller signal transmitter includes a memory table that stores data representing the commands and signal formats to use when transmitting wireless commands. Some user commands are transmitted as wireless commands to the television, other user commands are transmitted as wireless commands to the converter and at least one user command is transmitted as wireless commands to both the television and the converter.

10 Claims, 11 Drawing Sheets

220

224
```
List of Free-To-Guest Channels:
    000-007  Y
    008-015  Y
    016-023  Y
    024-031  N
    032-039  N
    040-047  N
    048-055  N
        •
        •
```

226
```
List of Pay-Per-View Channels:
    000-007  N
    008-015  N
    016-023  N
    024-031  Y
    032-039  Y
    040-047  Y
    048-055  Y
        •
        •
```

228

Channels Type and Frequency Assignment Map:

| Ch# | Invert | Type | Freq | Params | ChanID |
|---|---|---|---|---|---|
| 002 | N | P | 120MHz | 167, 83, 16 | "KFOX" |
| 003 | N | N | 128MHz | 175, 86, 16 | " " |
| 004 | N | N | 134MHz | 183  89, 16 | "ABC" |
| 005 | N | P | 140MHz | 189, 92, 16 | "CNN" |
| 006 | Y | P | 148MHz | 197, 95, 16 | "MTV" |
| • | | | | | |
| 126 | Y | P | 348MHz | 444, 95, 16 | " " |

229
```
Special Channels, Misc Parameters:
    Barker Ch:   08
    Hotel Ch:    19
    Conv ID:     34
    Serial #     34
    Room #:      1116
        •
        •
```

FIGURE 9

REMOTE CONTROL SYSTEM AND METHOD FOR CABLE TELEVISION SYSTEM

The present invention relates generally to cable television systems that enable users of the system's televisions to view, on demand, any one of a large number of recorded video programs in addition to a set of standard broadcast television stations, and particularly to a "view on-demand" cable television system that carries television signals in two or more signal formats, such as the NTSC, PAL and SECAM television signal formats.

BACKGROUND OF THE INVENTION

The present invention is applicable to video systems for hospitals, schools, condominiums as well as hotels and other systems having a large number of independently controlled televisions or video monitors. For the purposes of illustrating and explaining the invention, however, the prior art and the preferred embodiment of the invention will be described in the context of a video system for a hotel.

Hotels often provide video program services beyond those available on publicly available television channels and publicly accessible cable television. The main types of prior art systems are video tape rental systems, fixed schedule movie systems that broadcast pay-per-view programming on predefined channels on a fixed schedule as well as free programming on other channels, and on-demand movie systems that broadcast free programming on one set of channels and use other channels to transmit pay-per-view programming to to users upon request by the users.

The present invention provides a number of improvements on the on-demand type of cable television systems disclosed in U.S. Pat. No. 4,947,244, issued Aug. 7, 1990, entitled "Video Selection and Distribution System."

In particular, the present invention is designed to work in settings where the cable television system must carry television signals in two or more formats. For instance, in some places such as Singapore, some television channels are broadcast in PAL format while other television channels are broadcast in NTSC format. In other places television signals are broadcast both in SECAM and PAL formats. Furthermore, movies and other programming from various sources are recorded on cassettes in a variety of video signal formats, and each such cassette must be played using a video cassette player that outputs television signals in the corresponding signal format.

Another problem addressed by the present invention is that in some situations it is unacceptable to place a television converter box on top of the user's television set or anywhere else in the user's visual field, and yet the user must still be able to make program or channel selections using a remote control device pointed at the user's television. Furthermore, in these situations it is generally not possible (or not economically feasible) to modify the control circuitry in the television sets due to cost considerations and the age of the television sets. As a result, the cable converter box must be hidden from the user's view and cannot be connected to the television set's internal controller. Thus the only connection between the cable converter box and the television is a cable connected to the antenna or cable input port on the back of the television.

This presents two sets of problems: (A) the controller cannot turn the television on and off and cannot set the television to a particular channel, and (B) the controller cannot obtain signals directly from the television's controller for determining whether the television is on and similarly cannot obtain signals directly from the television's controller for determining the channel to which the television is tuned. Thus, unless some countervailing measures are taken, random use of the remote control wand while the user's television is off might result in the selection and playing of a pay-per-movie and a subsequent charge to the user despite the fact that the user's television is off.

SUMMARY OF THE INVENTION

In summary, the present invention is a cable television system in which a multiplicity of television program sources provide television signals in various predefined television signal formats. The program sources include continuous television sources provided to all users free of charge as well as pay-per-view program sources transmitted to users only upon request. Each television in the system has a multi-standard receiver for receiving television signals in those predefined television signal formats, and is coupled to a transmission medium such as a coaxial cable. A television signal switch transmits the television signals from various ones of the program sources onto the transmission media in assigned respective frequency channels.

Hidden behind each television, or elsewhere out of view of the user, is a converter coupling the respective television to the transmission media. The only connection from the converter to the television is a cable connected to the television's cable or antenna input port. Each converter includes a controller for selecting a channel in accordance with user commands, a channel map memory for storing data assigning to each accessible channel in a frequency band and a predefined television signal formats, and a frequency converter for switching a television signal received from transmission media on the selected channel to a predefined output channel to which the television is turned.

Each respective controller also includes an upstream transmitter for transmitting user program selection commands onto the transmission medium. The user program selection commands are received at the head end of the system by a switch that decodes those commands and transmits corresponding setup signals to the television signal switch.

Each television includes an on/off switch for turning the television on and off a tuner coupled to an input signal port, a wireless signal sensor and decoder for receiving and decoding a first defined set of wireless command signals having a first predefined set of coding sequences. The television's wireless signal decoder ignores wireless command signals not in the first defined set. The television also includes a controller that responds to wireless on/off commands by toggling its on/off switch, and responds to TV channel selection commands by sending corresponding channel selection signals to the tuner.

The converter box includes a wireless signal sensor and detector for receiving and decoding a second defined set of wireless command signals having a second predefined set of coding sequences. The converter box's wireless sensor is preferably located near or on the housing of the television. The television's wireless signal decoder ignores wireless command signals not in the second defined set. The converter's controller responds to wireless channel selection commands by tuning the frequency converter to a respective television channel and/or by transmitting pay-per-view requests to the controller at the head end of the system.

A remote controller signal transmitter is used by a user of each television. The remote controller includes a user interface for selecting user commands, a memory table, and a transmitter. For each wireless command the memory table stores data representing the command and the carrier frequency to use when transmitting the wireless command. Some user commands are transmitted as wireless commands to the television, other user commands are transmitted as wireless commands to the converter and at least one user command is transmitted as wireless commands to both the television and the converter.

Each television further includes a raster scan CRT and CRT control circuitry that controls the raster scan sweep pattern of the electron beams generated by the CRT. The CRT control circuitry includes a horizontal scan synchronization circuit that synchronizes each horizontal sweep of the CRT electron beams with a horizontal synchronization signal in the received television signal, and generates a distinctive transient voltage signal at the beginning of each horizontal sweep of the CRT electron beams.

External to the converter box is a horizontal sweep pickup antenna suitable for positioning proximate the monitored television. Internal to the converter box is a filter that extracts the horizontal synchronization component of the television signal on the channel selected by the user. A synchronization signal comparator compares the extracted horizontal synchronization component of the selected television signal with the signals, if any, received from the antenna, and outputs a result signal indicating whether the television is both turned on and tuned so as to receive the selected television signal.

BRIEF DESCRIPTION OF THE DRAWINGS

Additional objects and features of the invention will be more readily apparent from the following detailed description and appended claims when taken in conjunction with the drawings, in which:

FIG. 9 is a block diagram representation of the data map stored in the television signal converter in the preferred embodiment of the present invention.

DESCRIPTION OF THE PREFERRED EMBODIMENT

Figure 1:
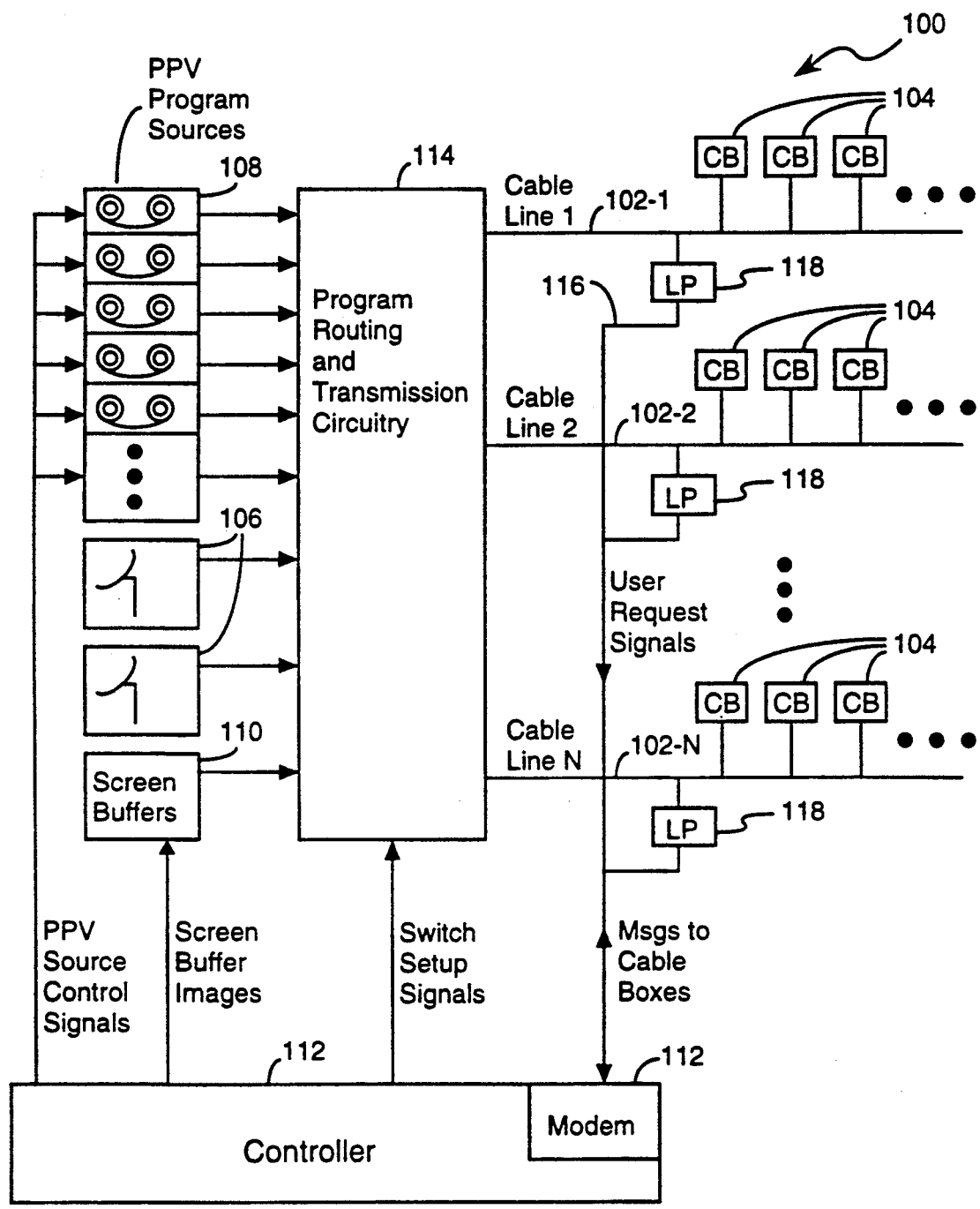
FIG. 1 is a block diagram of a preferred embodiment of a cable television system incorporating the present invention.

Referring to FIG. 1, there is shown a cable television system 100 having a number of cable distribution lines 102-1 to 102-N on which free television programs and pay-per-view programming are transmitted to the users of the system. For each user's television set, a converter 104 is provided for the purposes of (A) receiving user commands to select a television channel or pay-per-view program and for (B) shifting the selected program from its broadcast channel to a pre-selected channel, such as channel 2 or 3, to which the user's television is tuned.

The preferred embodiment of the cable television system 100 will be described in the context of an installation of the system in a hotel. However, the present invention could be used in a much broader spectrum of applications, including cable television systems for institutions and cable television systems for residential neighborhoods. The primary difference between such various applications of the present invention will be the manner in which the user's are charged for various services. The underlying hardware, program distribution methodologies and the like would remain substantially the same as described herein.

Overview of Head End of Cable Television System

The programming sources used by the system include continuous broadcast television program receivers 106 that receive programming on various preassigned television channel frequencies. In most cases the continuous broadcast television programs are retransmitted to all users of the system free of charge. In many cities there are continuous broadcast television programs available in more than one standardized broadcast format. For instance, in some locations both PAL (the European television signal format) and NTSC (the American television signal format) television signal are used, while in other locations both PAL and SECAM (the French television signal format) television signals are used. While "multi-standard" television sets are available for use in such locations, television cable systems have generally used a single television signal standard for all programs transmitted on a particular cable system.

Other programming sources used by the system 100 include non-continuous broadcast sources, herein called "pay-per view" sources, such as video cassette players and video disk players 108. In the preferred embodiment, both PAL and NTSC video cassette players can be used. In other embodiments, both continuous broadcast television program sources and non-continuous television program sources using other combinations of television signal formats could be used.

One additional source of "programming" for the system is a set of screen buffers 110, also called frame buffers, for storing video images to be transmitted to users of the system. The screen buffers 110 store images representing menus of currently available pay-per view movies, images explaining to users how to use the system, as well as additional screen buffers for interactive services such as displaying a hotel guest's bill as part of an express check-out service. The images stored in the screen buffers 104 are generated and updated as necessary by a controller 112, typically a microcomputer such as an "IBM compatible" computer using a 803086 Intel microprocessor.

The audio-video signals from the programming sources 106, 108 and 110 are routed, frequency shifted to occupy selected television channels and retransmitted onto the various distribution cables 102 by program routine and transmission circuitry 114. Circuitry 114 includes a video crossbar switch for each cable line 102 and a set of re-transmission modulators that enables simultaneous connection of any selected combination of the programming sources 106, 108 and 110 to the corresponding cable 102.

A more detailed description of the program routing and transmission circuitry 114 can be found in U.S. Pat. No. 4,947,244, issued Aug. 7, 1990, entitled "Video Selection and Distribution System," which is hereby incorporated by reference. U.S. Pat. No. 4,947,244 also contains a detailed description of how the controller 112 generates menus of available pay-per programs and also how the controller 112 responds to user requests for menus and pay-per view (PPV) programming by sending appropriate "PPV source control signals" to the video cassette players 108 and appropriate switch setup signal to the program routing and transmission circuitry 114.

It should be noted that the video program sources 106, 108, 110, the controller 112 and the program routing and transmission circuitry 114 are all located at the "head end" of the cable system. Signals and programming transmitted from the head end of the cable system to the users are said to travel "downstream". Request signals transmitted by the cable boxes 104 in user's rooms are said to travel "upstream".

Each of the cable lines 102 is coupled back to the controller 112 by a communication line 116 and a bi-directional low-pass filter 118 that couples the communication line 116 to each respective cable line 102. Digitally encoded messages between the controller 116 and individual cable boxes 104 are sent using modems, which operate a frequencies much lower than television signals, nominally 7 MHz in the preferred embodiment. Television channel signals typically start at frequencies above 50 MHz. In the preferred embodiment the low pass filters 118 has a cutoff frequency of 8 MHz.

In most respects, the head end of the cable television 100 of the present invention is configured and operates in the same manner as described in U.S. Pat. No. 4,947,244. The few aspects of the head end's operation that differ from U.S. Pat. No. 4,947,244 are described below with reference to FIG. 13.

Cable Box Multi-Standard Converter

Figure 2:
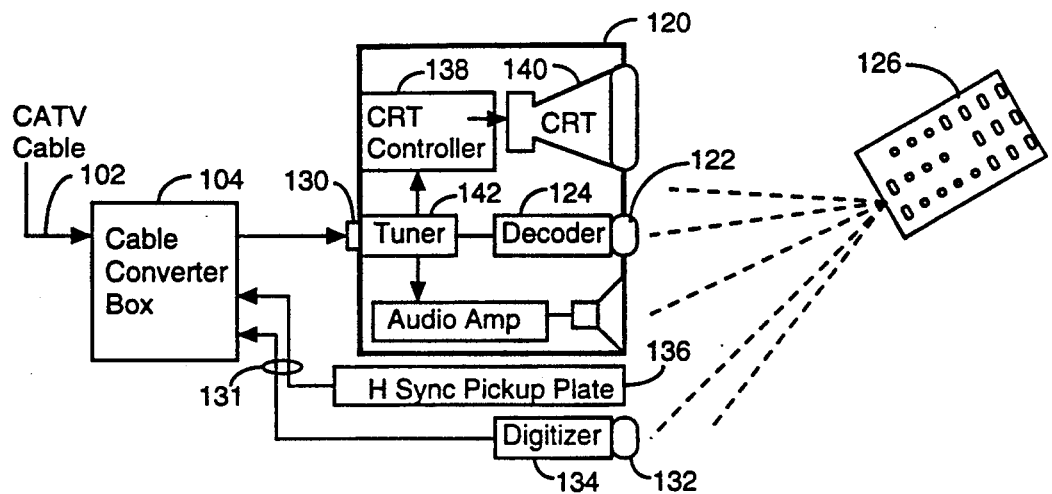
FIG. 2 is a conceptual representation of the remote control scheme used with each television in the preferred embodiment of the present invention.

Referring to FIG. 2, one aspect of the present invention is the physical configuration of equipment in each user's hotel room. Generally, the user's television 120 includes an infrared (IR) receiver 122 and decoder 124 for receiving control commands from the user via a remote control wand 126. The normal remote control wand for the television is replaced by a programmable remote control wand 126 that is programmed to transmit signals to both the television 120 and the cable box 104, as will be described in more detail below.

The cable converter box 104 can be hidden behind the television 120, or on the floor behind the piece of furniture on which the television is mounted, with the only connection from the converter box 104 to the television 120 being a standard cable television connection to the television's antenna port or cable input port 130 on the back of the television. Tethered to the converter box by an extended cable 131 are an infrared (IR) receiver 132 and digitizer 134, as well as a pickup plate 136 that acts as an antenna for detecting the large voltage horizontal synchronization pulses output by the television's CRT controller 138. The digitizer 134 generates a binary pulse stream that tracks the wireless commands received by the IR receiver 132, although wireless commands that are not transmitted on the carrier frequency to which the receiver 132 is tuned are ignored.

The raster scan cathode ray tube (CRT) 140 in the television 120 requires a large voltage transient to reset the CRT's beam back to the left edge of the screen at the beginning of each horizontal sweep of the CRT's beams. The CRT controller 138 produces the requisite horizontal reset and vertical reset control voltages in synchronization with the horizontal and vertical synchronization signals in the television signal output by the television's tuner 142.

The converter box's IR receiver 132 and pickup plate 136 are typically positioned proximate the television 120, such as under or on the side of the television, with the IR receiver 132 being positioned so that all IR encoded signals output by the remote control wand 126 are received by both the television's IR receiver 122 and the converter box's IR receiver 132.

Figure 3:
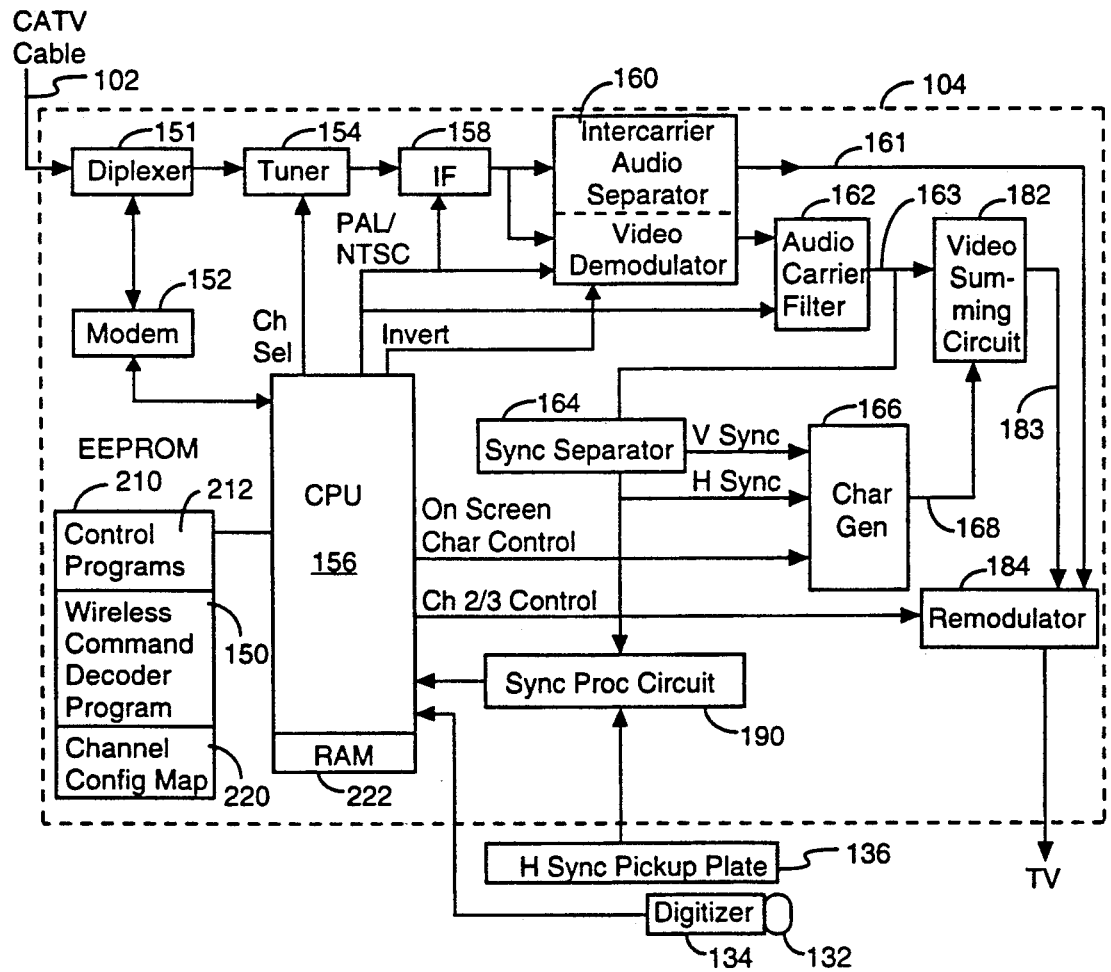
FIG. 3 is a block diagram of the converter used in conjunction with each television in the preferred embodiment of the present invention.

Referring to FIG. 3, the converter's CPU 156, which is an 8032 microcontroller made by Intel in the preferred embodiment, receives the binary pulse train produced by the IR sensor 132 and digitizer 134 and decodes the pulse train to determine the command, if any, that is being sent to it. Note that the CPU's wireless command decoder software 150 ignores wireless commands that do not match a predefined signal or coding format and/or command prefix associated with all wireless commands directed to the converter box 104.

The cable signal received by the converter box 104 passes through a splitter 151, which is essentially a low pass filter for passing digitally encoded signals from the head end controller to a modem 152 in the converter box, and a high pass filter for passing video signals to a tuner 154.

The cable 102 in the preferred embodiment carries PAL format television signals on some channels and NTSC format television signals on other channels. NTSC tuners typically output an intermediate frequency (IF) signal having a carrier frequency of 45.75 MHz and PAL tuners typically output an IF signal having a carrier frequency of 38.9 MHz. The converter's tuner 154 receives a channel selection signal from the converter's CPU 156. The tuner 154 is a special multistandard tuner capable of outputting 45.75 MHz video for NTSC signals and 38.9 MHz video for PAL signals. This is accomplished by tuning the local oscillator of the tuner to produce an IF of either 45.75 or 38.9 MHz.

Figure 4:
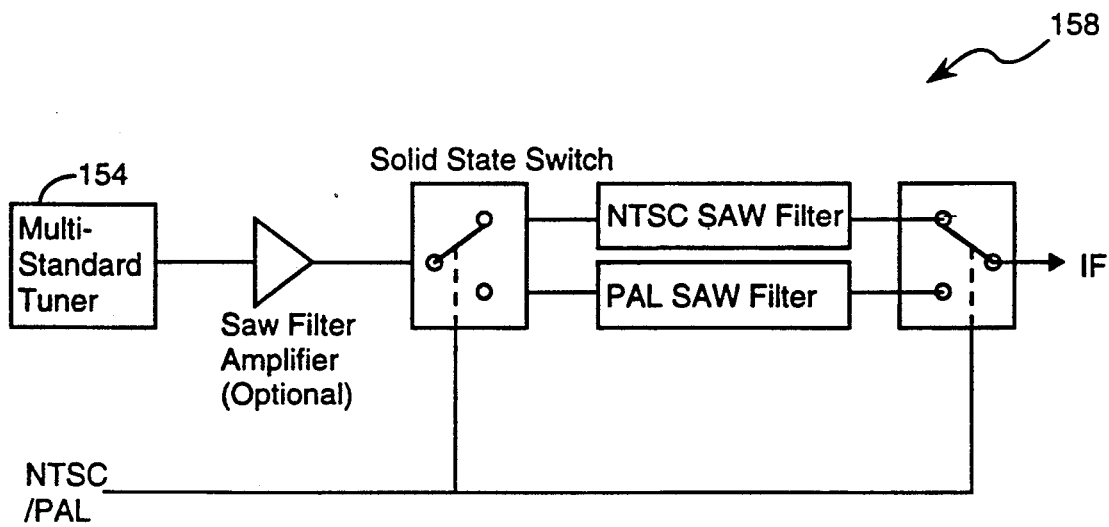
FIG. 4 is a circuit schematic of a multi-standard IF signal filter used in the preferred embodiment of the television signal converter of the present invention.

The output of the tuner is filtered by an IF SAW filter 158, shown in more detail in FIG. 4, so as to pass only the selected channel. Based on the channel map and the user selected channel, the CPU 156 generates a binary signal, labeled NTSC/PAL that indicates whether the currently selected channel is an NTSC or PAL channel. The NTSC/PAL control signal is used to select the path for the IF signals (NTSC IF or PAL IF).

The output of the IF filter 158 is next processed by a video signal processing circuit 160 (the MC44301 made by Motorola) that includes an audio intercarrier signal separator circuit, a video signal demodulator and video signal inverter. The video signal demodulator portion of circuit 160 shifts the entire IF signal down to baseband and also inverts the video signal if the Invert signal produced by the CPU 156 is enabled. The audio separator portion of circuit 160 automatically separates the audio component of the IF signal and outputs it on line 161 (labeled "Aural").

In the preferred embodiment, the video baseband signals of pay-per-view programs are inverted at the head end before transmission over the cable 102 so that the pay-per view programs are not viewable by an ordinary television connected to the cable line 102. In alternate embodiments of the invention other signal protection schemes could be used for pay-per view programming.

The baseband video signal generated by video demodulator 160 still contains an audio component, which is offset by 4.5 MHz from the video signal carrier in NTSC format signals and is offset by 5.5 MHz from the video signal carrier in PAL format signals.

Figure 5:
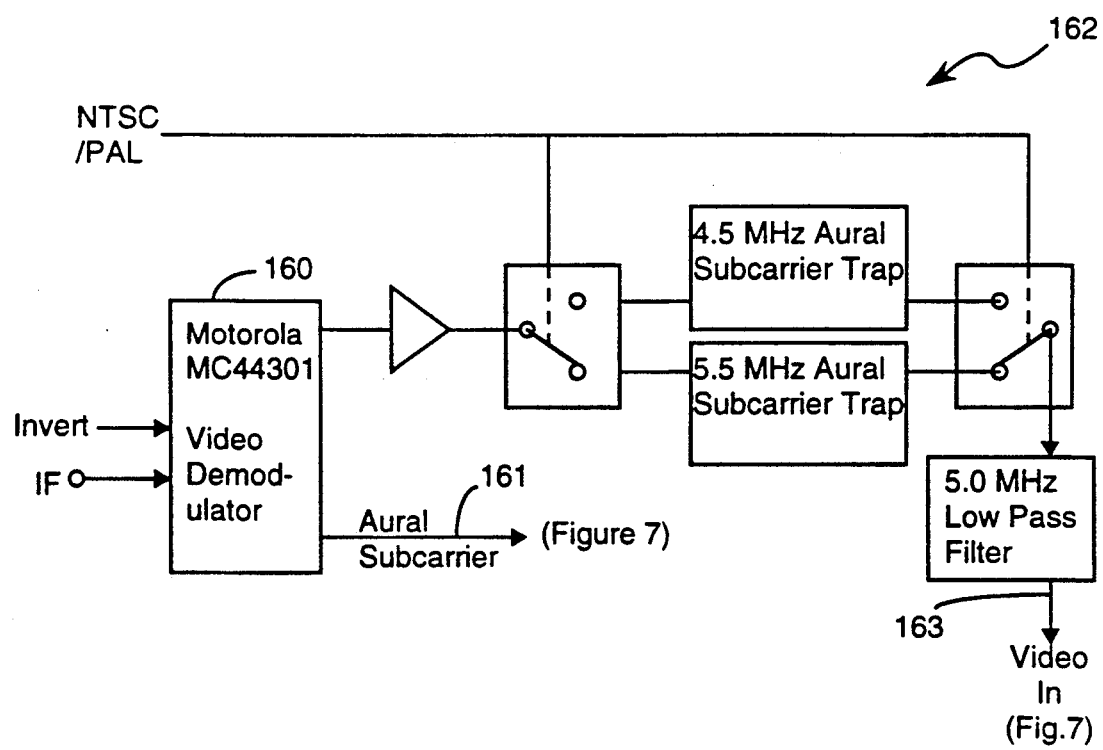
FIG. 5 is a circuit schematic of the audio/video signal splitter circuit used in the preferred embodiment of the television signal converter of the present invention.

FIG. 5 shows the audio intercarrier filter 162 used in the preferred embodiment to filter out the radio frequency component of the baseband video signal upon which the audio signal is modulated. In particular, circuit 162 receives a NTSC/PAL signal from the CPU 156. If the NTSC/PAL signal is equal to "1", indicating that the video signal on the selected channel is a PAL format signal, then the PAL sound trap portion of the circuit is enabled so as to remove the intercarrier audio signal centered at about 5.5 MHz. If the NTSC/PAL signal is equal to "0", indicating that the video signal on the selected channel is an NTSC format signal, then the NTSC sound trap portion of the circuit is enabled so as to remove the intercarrier audio signal centered at about 4.5 MHz. In both cases, the resulting filtered signal is further filtered by a 5.0 MHz low pass filter, and then the video signal is output on line 163. The audio signal on line 161 is not demodulated, but rather is the high-pass filtered portion of the television program signal, and thus will have a carrier frequency of 4.5 or 5.5 MHz for NTSC or PAL television signals, respectively.

Figure 6:
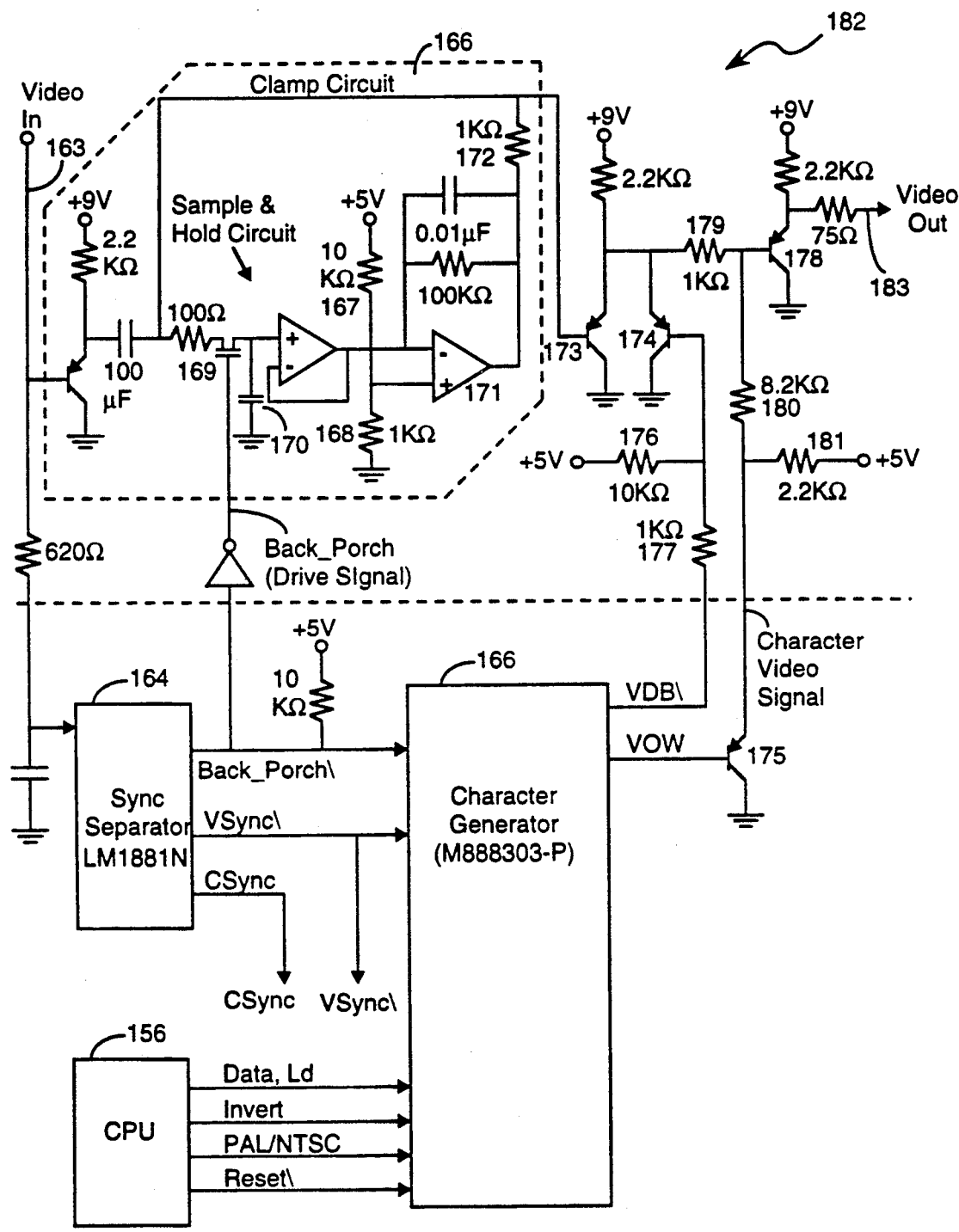
FIG. 6 is a circuit schematic of the message generator circuit, for superimposing messages on the video signal of the selected television channel, used in the preferred embodiment of the television signal converter of the present invention.

Referring to FIGS. 3 and 6, a synchronization separator circuit 164 (such as the LM1881N made by National Semiconductor) filters the video signal output by audio filter 162 to generate horizontal and vertical synchronization signals CSync (which is actually a composite synchronization signal) and VSync \ (which is a negative logic signal that goes low whenever a vertical synchronization pulse occurs in the video signal). Instead of generating a separate horizontal synchronization signal, the synchronization separator circuit 164 generates a "combined synchronization" signal CSync that includes both the horizontal and vertical synchronization pulses. Since vertical synchronization pulses occur much less often than horizontal synchronization pulses, the CSync signal is usable as a horizontal synchronization signal for the purposes of the present invention, as will be described below.

The converter box's CPU 156 is programmed to generate commands that specify sequences of characters to be superimposed on the video image shown on the user's television, such as temporirily displaying a channel identifier for the channel selected by the user. A character generator 165 (such as the M888303-P made by Fujitsu) receives the commands from the CPU 156 specifying the on-screen characters to be displayed, as well as the horizontal and vertical synchronization signals from the synchronization separator circuit 164, and generates a corresponding video signal that is synchronized with the video signal on line 163.

More specifically, the character generator 165 provides a "box" signal VDB \ which provides a black area on the screen where white characters are overlaid by the VOW signal. Both the VDB \ and VOW signals are black-low. In order to add the box and characters to the video signal, they must all have a common reference level. The most convenient and stable reference is black. To reference the video signal, synchronous clamp circuit 166 references the video signal's back porch to the DC voltage produced by voltage divider 167–168. The FET series switch 169 stores the back porch voltage on capacitor 170. Amplifier 171 applies the DC error signal through resistor 172 to assure that a constant DC level corresponding to black is maintained at the base of transistor 173. The purpose of transistors 173, 174 and 175 is to "punch out" a black box with white characters from the video background. The singular polarity (PNP) of these devices provides first-order temperature compensation with a simplified switching function. When transistor 174's base is pulled low by VDB \, voltage divider 176–177 causes the same black level to be asserted as established by voltage divider 167–168. Simultaneously, transistor 173 is reverse biased, disconnecting the video signal. When transistor 175 is turned off by VOW going high, the black box video signal from transistor 174 is passed through transistor 178. VDB \ is always low in a defined character region or window. When transistor 175 is turned on by VOX going low, a white signal level forming the body of a character is determined by voltage divider 179, 180, 181. Thus, video summing circuit 182 combines the input video signal from line 163 with the character generator's video signal to produce a composite video signal on line 183.

Modulator Circuit for Recombining Audio and Video Signals

Figure 7:
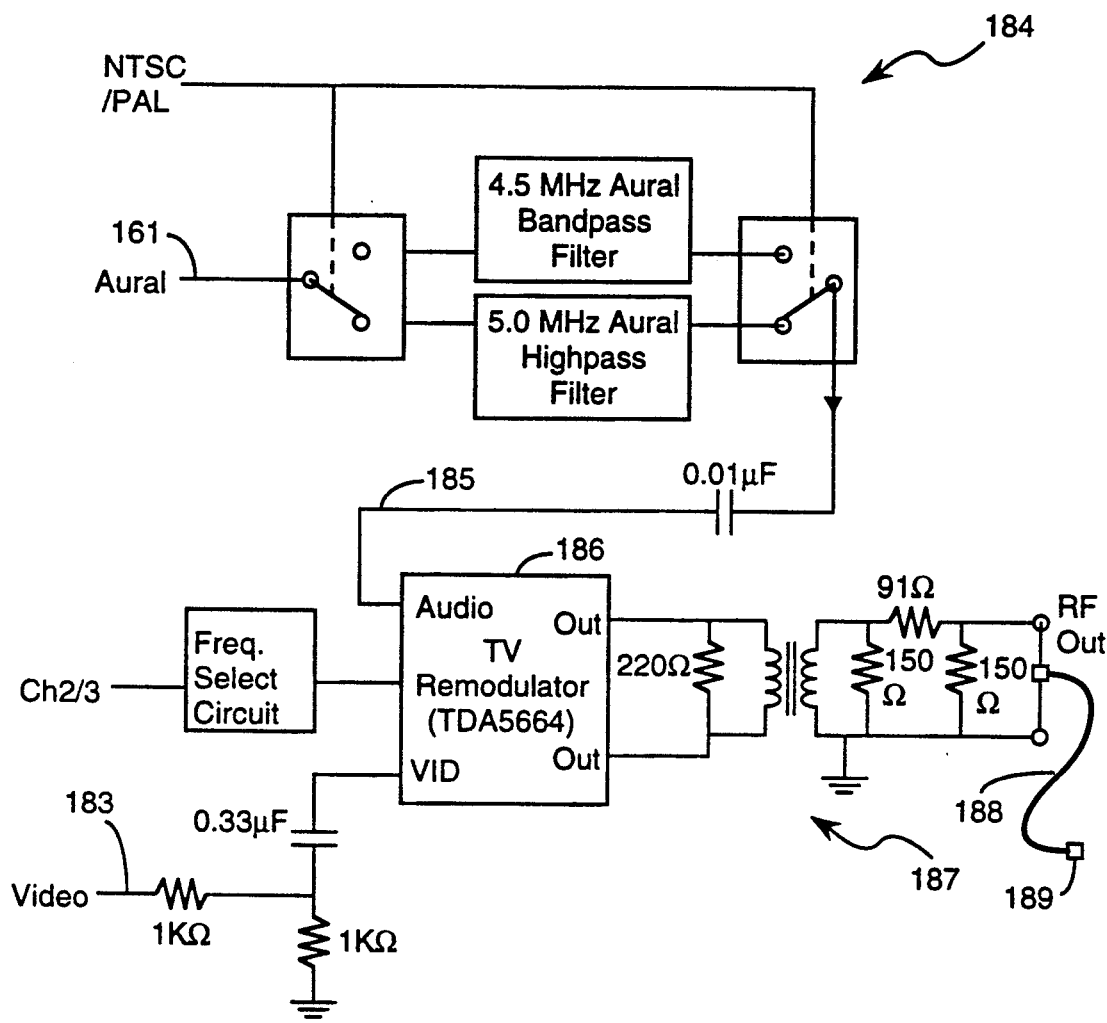
FIG. 7 is a circuit schematic of the audio/video remodulation circuit used in the preferred embodiment of the television signal converter of the present invention.

Referring to FIGS. 3 and 7, remodulator circuit 184 adds the intercarrier audio signal (Aural) on line 161 back into the combined video signal from line 183. The remodulation circuit 184 has separate bandpass filtering paths for NTSC audio signals and PAL audio signals because of their distinct carrier frequency positions. The resulting filtered intercarrier audio signal on line 185 is combined with the video signal from line 183 and remodulated onto a specified one of two channel frequencies by television remodulator circuit 186, which in the preferred embodiment is a TDA5664 made by Siemens. The channel frequency on which the television is output is selected by a command signal from the converter box's CPU. In one preferred embodiment the modulator circuit outputs the remodulated television signal on VHF channel 2 or 3, while in another preferred embodiment the remodulator circuit 184 outputs the television signal on UHF channel 31 or 32. The modulated signal output of the remodulator circuit 186 is passed through an isolation transformer 187 and then a coaxial cable 188 and connector 189 that can be coupled to a corresponding connector on the user's television.

Television On/Off and Channel Monitoring

Figure 8:
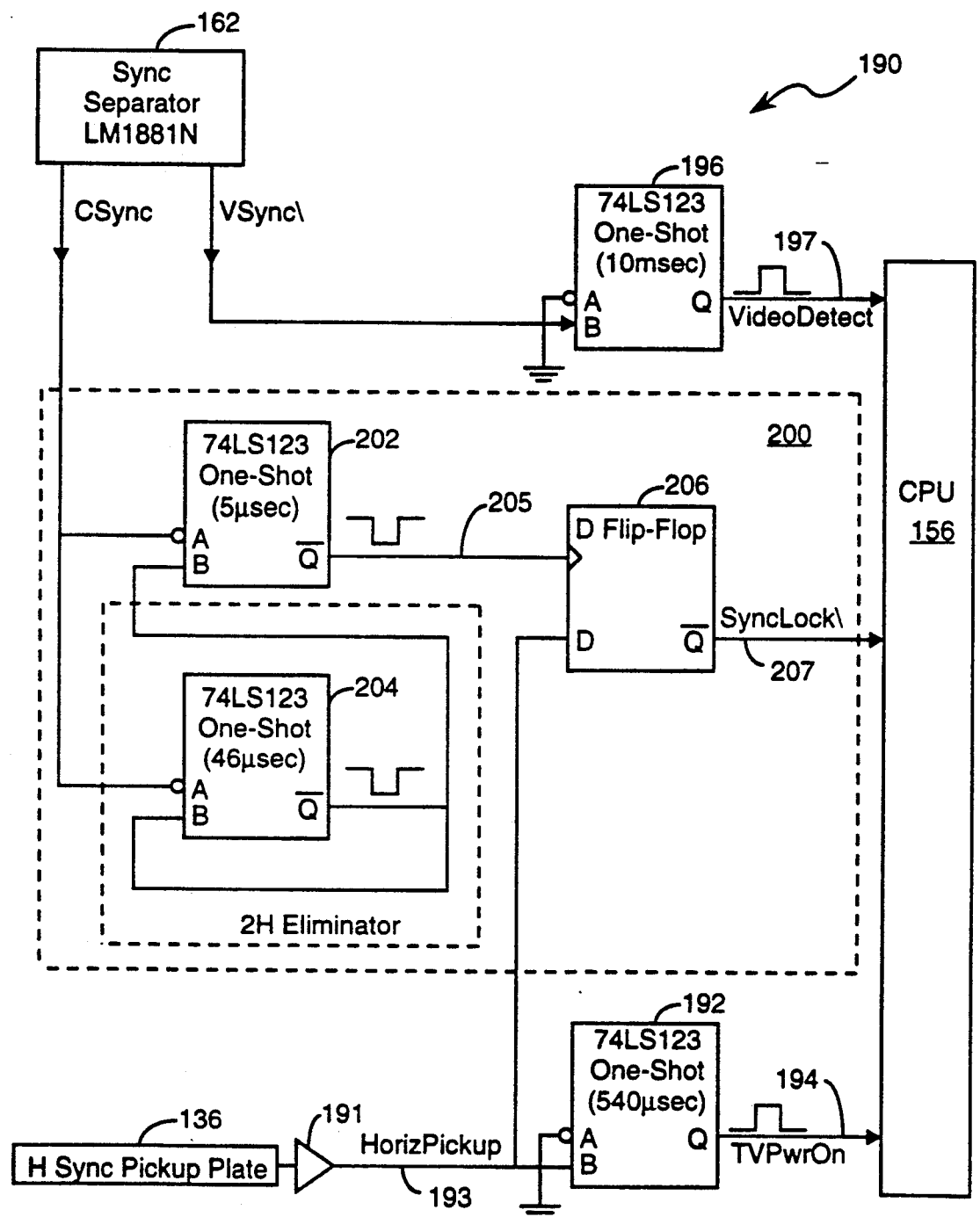
FIG. 8 is a circuit schematic of the television status monitoring circuit, for determining if a television is on and tuned to a particular channel, used in the preferred embodiment of the television signal converter of the present invention.

Referring to FIGS. 2, 3 and 8, the converter box 104 moniors whether the television 120 to which it is (or should be) connected to determine (A) if the television 120 is on, and (B) if the television 120 is tuned to the channel on which the cable box is generating its output signal. It is an underlying premise of the present invention that no direct connections other than the output cable 188 exist between the cable box 104 and the television set.

This television monitoring aspect of the present invention is based on the following observation. While the horizontal sweep rate of all NTSC television channels is approximately the same, and the horizontal sweep rate of all PAL television channels is approximately the same, the exact timing of the horizontal synchronization signals on the various channels are not synchronized. That is, the horizontal sweep frequency can vary from one channel to the next by slight amount, and there is no coordination whatsoever of the phases of the horizontal synchronization signals of the various channels.

The primary purpose of the synchronization processing circuit 190 is to compare the (low frequency) horizontal synchronization signals from the baseband version of the television channel that is being output by the cable box 104 with the horizontal sweep control signals generated by the CRT controller 138 in the television set 120. The synchronization processing circuit 190 also generates a clean version of the vertical sync signal and a signal indicating whether the television set is on, both for use by the CPU 156. The CRT controller 138 includes a horizontal scan synchronization circuit that synchronizes each horizontal sweep of the CRT electron beams with a horizontal synchronization signal in the received television signal, and generates a distinctive transient voltage signal (sometimes called the "horizontal flyback" signal) at the beginning of each horizonal sweep of the CRT electron beams.

The pickup antenna 136 is positioned proximate the monitored television 120 so as to pick up low frequency (e.g., less than 100 KHz) electromagnetic signals produced by the CRT controller 138, the dominant component of which is the 15.734 KHz horizontal flyback signal. The transient signals picked up by antenna 136 are digitized by comparator 191 and fed to the input for a retriggerable monostable multivibrator (also known as a one-shot circuit) 192 such as a 74LS123. The multivibrator 192 is set up to generate a signal with a pulse width of 540 microseconds, which is considerably longer than the 63.5 microsecond period of the horizontal flyback signal. Therefore, as long as horizontal pulses from the television set 120 are detected at most 540 microseconds apart (i.e., as long as at least one of every eight horizontal flyback signals are detected), the output of the multivibrator 192 on the TVPwrOn line 194 will always stay high. In summary, the TVPwrOn signal on line 194 is kept continuously high if and only if the monitored television 120 set is turned on, regardless of the channel to which the television is tuned.

Circuit 190 also detects whether the channel selected for output by the converter's CPU actually contains a video signal. In particular, the VSync \ signal produced by the synchronization separator circuit 162 is used to trigger a one-shot circuit 196. The one-shot circuit 196 produces a stream of VideoDetect signals on line 197 if and only if the selected channel is carrying a video signal.

Finally, subcircuit 200 is used to determine if the horizontal synchronization signal CSync of the selected channel matches the HorizPickup signals on line 193. Two one-shot circuits 202 and 204 process the CSync signal so as to produce a negative logic clock signal on line 205 that matches the phase and frequency of the horizontal synchronization signal on the selected channel. D flip-flop 206 reads the HorizPickup signal on line 193 at the rising edge of each clock signal on line 205. The value stored by the flip-flop 206 is output in negative logic form as the SyncLock \ signal on line 207. In particular, if the television set is tuned to the channel output by the converter box, the HorizPickup signal will be high (i.e., equal to a logic value of "1") when the signal output by one shot 202 on line 205 has a rising edge. Thus the SyncLock \ signal will be low when the television is tuned to the channel output by the converter box.

The control software 210 for the converter box 104 is programmed to respond to the TVPwrOn, VideoDetect and SyncLock \ signals as follows. Table 1 contains a pseudocode representation of the control software routines executed by the CPU in the converter box to monitoring the VideoDetect, TVPwrOn and SyncLock \ signals. Those routines will now be described in the same order as they are found in Table 1.

An interrupt routine is triggered by the VideoDetect signal, which should happen 60 times per second, and computes a value called Vsync_Cnt that indicates if the vertical sync pulse (i.e., the VideoDetect signal) has been consistently detected. If no vertical sync pulse is detected for a period in excess of two seconds, or if vertical sync pulses are detected less than fifty percent of the time, then the control software sends a "No_Vid" message to the head end controller and switches the tuner in the converter box to a free-to-guest channel.

The SyncLock \ monitoring routine is triggered by the expiration of the Vsync_Wait timer, which is a 4 millisecond software timer that is triggered by each occurrence of the VideoDetect signal. The routine computes a value called SyncLock_Cnt that indicates if the SyncLock \ signal has been consistently detected. However, this routine is used only when the television is tuned to a special services channel for viewing a movie, menu or the like. If the SyncLock \ signal is not detected for a period in excess of one second, or if SyncLock \ is consistently detected less than fifty percent of the time, that indicates that the program on the special services channel is either not being received or that the quality of the received video signal is poor. Alternately, the television set may not be tuned to the correct channel (e.g., channel 2 or 3) for receiving video signals from the converter box. If the television is tuned to the wrong channel, the SyncLock \ signal will typically be invalid (i.e., high) more than 90% of the time and that will cause a "no sync lock" condition to be detected very quickly, typically in about one second. Whenever a "no sync lock" condition is detected, the control software sends a "No_Vid" message to the head end controller and switches the tuner in the converter box to a free-to-guest channel. In an alternate embodiment, the control software sends a "TV on Wrong Channel" message to the head end controller when the VideoDetect signals are being consistently received but the SyncLock signal is not valid. Either way, the controller at the head end of the system will receive a message indicating that the converter box no longer needs to receive a menu. However, unlike the "No_Vid" message, a "TV on Wrong Channel" message does not indicate a problem with a video source (such as a screen buffer) or with the cable lines 102.

Note that if the television is tuned to the wrong channel, the user will be unable to view the menus of movies and other special services sent by the head end of the system, and thus the user will be unable to select a movie for viewing.

TABLE 1

Control Software Pseudocode for Vertical Sync and SyncLock Monitoring

```
--Definitions:
-- Vsync_Tmr      is a 20 millisecond count down timer that is reset to 20ms
                  every time a vertical sync signal (VideoDetect) is detected.
-- Vsync_Wait     is a 4ms count down timer that is reset to 4ms every time
                  a vertical sync signal (VideoDetect) is detected.
-- Vsync_Idle     Set to 1 whenever Vsync_Tmr times out (reaches a value
                  of zero). Set to 0 whenever a vertical sync signal
                  (VideoDetected) is detected.
-- Vsync_Cnt      8-bit value that is incremented whenever a bad vertical sync
                  condition is detected and is decremented whenever a good
                  vertical sync condition is detected.
                  Vsync_Cnt should always equal zero if a good video signal
                  is being received. A vertical sync signal should be received
                  every 16.7 ms.
-- SyncLock_Cnt   8-bit count value that should equal zero during proper system
                  operation. Used in similar manner to Vsync_Cnt.
-- State()        Status of converter specified by several on/off flags including
                  "Tuning_in_Progress" -- converter changing channels
                  "Watching_Movie_or_Menu" -- converter tuned to any special
                  services channel
                  "No_Vid_Cond" -- no video signal detected
                  "TV_is_On" -- based on TVPwrOn signal
                  "Power_Hold_Off" -- initialization condition
-- Vertical Sync Interrupt Service Routine:
Upon Receiving each VideoDetect Signal, Do {
    If (Tuning_in_Progress) Return;
    If (Vsync_Idle = 1) {        -- Vsync_Tmr timed out
        Vsync_Idle = 0;          -- Reset b/c Vsync received
    }
    Else {                       -- Vsync_Tmr has not timed out
        If (10ms ≦ Vsync_Tmr≦20ms) {
            If (Vsync_Cnt ≠ 255) increment Vsync_Cnt;
        Else {
            If (Vsync_Cnt ≠ 0) decrement Vsync_Cnt;
        }
    }
    Set Vsync_Wait = 4ms;        -- start 4ms timer
    Set Vsync_Tmr = 20 ms;       -- start 20ms timer
    Return;
}
-- Vertical Sync Foreground Routine:
Whenever Vsync_Tmr times out (reaching a value of zero) Do: {
If (TV_is_On.and.Watching_Movie_or_Movie.and.Not(Tuning_in_Progress))
    {
    If (Vsync_Cnt ≠ 255) increment Vsync_Cnt;
    Vsync_Idle = 1;              -- set flag for use by interrupt routine
    If (Vsync_Cnt > 127) {       -- threshold could be any value up to 254
        Set No_Vid_Cond status flag;
        Send "No_Vid Message" to head end controller;
        Switch converter's tuner to a free-to-guest channel;
    }
}
Return;
-- end of timeout foreground routine
-- 4 Second Hold Routine:
If No_Vid status is set {
    Wait 4 seconds;
    Monitor Vsync_Cnt;
    When Vsync_Cnt remains < 60 for 4 seconds {
        Clear No_Vid_Cond status flag;
    }
```

TABLE 1-continued

Control Software Pseudocode for Vertical Sync and SyncLock Monitoring

```
}
Return
-- SyncLock Service Routine:
Whenever Vsync_Wait times out, Do: {
    If (TV_is_On .and. Watching_Movie_or_Movie .and.
        Not(Tuning_in_Progress) .and. Not(No_Vid) ) {
        Do Four Times (Approx. Once Per Millisecond): {
            If SyncLock is Valid {
                If (SyncLock_Cnt ≠ 0) decrement SyncLock_Cnt;
            }
            Else {
                If (SyncLock_Cnt ≠ 255) increment SyncLock_Cnt;
            }
            If (SyncLock_Cnt > 192) {    -- threshold could be
                                         -- any value up to 254
                Send "No_VID Message" to head end controller;
                Switch converter's tuner to a free-to-guest channel;
            }
        }
    }
    Return
}
```

In summary, the synchronization processing circuit 190 determines whether or not the monitored television 120 is turned on, whether the monitored television 120 is tuned to the correct channel to receive television programs from the converter box 104, and whether vertical sync signals are present in the television channel to which the converter is presently tuned.

It should be noted that the synchronization comparator 190 could be implemented entirely in software (except for the pickup antenna) in alternate embodiments of the invention. In particular, a microprocessor could easily be programmed to sample the pickup antenna signal and the horizontal sync signal from the selected cable channel and to compare those two signals. However, the preferred embodiment's use of hardware to perform the signal comparison reduces the computational burden on the microprocessor.

Converter Box's Channel Map

Referring to FIG. 3, the CPU 156 in each converter box 104 is coupled to EEPROM 210 for storing the CPU's control programs 212 as well as a "channel configuration map" 220 that defines the cable channels that the converter box is allowed to access. Internal to the CPU 156 is a random access memory array 222 sufficient for executing the control programs 212.

Referring to FIG. 9, the channel configuration map 220 defines which channels on the CATV cable 102 carry free-to-guest programming (list 224), and which channels are used to carry pay-per view programming (list 226). The channel map 220 also includes a table 228 that defines for each channel (A) the signal format used (e.g., NTSC or PAL) used on that channel, (B) the mixing frequency to be used by the cable box tuner 154 for receiving the channel (which is equivalent to specifying the channel's carrier frequency), (C) other control parameters used by the converter box's CPU 156 in conjunction with use of that channel, (D) an optional channel identifier string that is temporarily superimposed on the television screen when the channel is first selected, and (E) a flag indicating whether or not the channel is transmitted in inverted format. In the preferred embodiment, pay-per-view programs are inverted at the head end before transmission over the cable 102 so that the pay-per view programs are not viewable by an ordinary television connected to the cable line 102.

Finally, the channel map 220 includes additional information in table 229, including parameters identifying special channels such as the "barker" channel, which is the channel to which the converter tunes whenever an on/off command is received), the hotel services channel, a unique serial number assigned to the converter box, the room number in which the converter box is located, and so on.

When the converter box is first assembled, the EEPROM 220 is loaded with the control software 212 and a default channel configuration map. The default configuration map loaded into each converter box 104 includes a unique serial number and a predefined special "room number" that indicates to the control software executed by the CPU 156 that the converter box 104 has not yet been configured for actual use in a hotel.

Referring to FIGS. 1, 2, 3 and 11, when the cable television system 100 is first installed and each respective converter box 104 is powered on, the CPU 156 in the converter box 104 scan its the channel configuration table and detects the special room number that indicates that the converter box has not yet been configured for use at a particular installation. Instead of outputting a normal television channel, the converter box 104 tunes to no channel and outputs a display screen prompting the installer of the system to configure the box 104. A sequence of menus generated by the control software 212 prompts the installer to enter the room number in which the convert box is located. Every converter box 104 at a particular installation of the system is assigned a unique room number. Thus, if multiple converter boxes are located in a single hotel suite, each television is nevertheless assigned a unique room number (e.g., by assigning room numbers such as 319A, 319B and so on to suite room number 319).

After the room number and any other configuration parameters have been loaded into the converter box's EEPROM 210, the control software 212 sends a "load configuration map for room X" command to the head end controller 116. The "load configuration map" message also identifies the serial number of the converter box making the request, and that serial number is stored by the head end controller in a room number assignment table.

The head end controller 116 responds to the "load configuration map" command by transmitting the configuration map for that room via its modem 112 and the cable lines 102. The message containing the configuration map includes a header that identifies the room to which the map belongs. While all converter boxes 104 in the system will receive the message, only the one converter box 104 that has been assigned the room number listed in the message header loads the received channel configuration map into its EEPROM 210. The control software in each converter box ignores all received messages whose header does not specify a destination matching the room number assigned to the converter box.

Remote Control of Television and Converter Box

Figure 10:
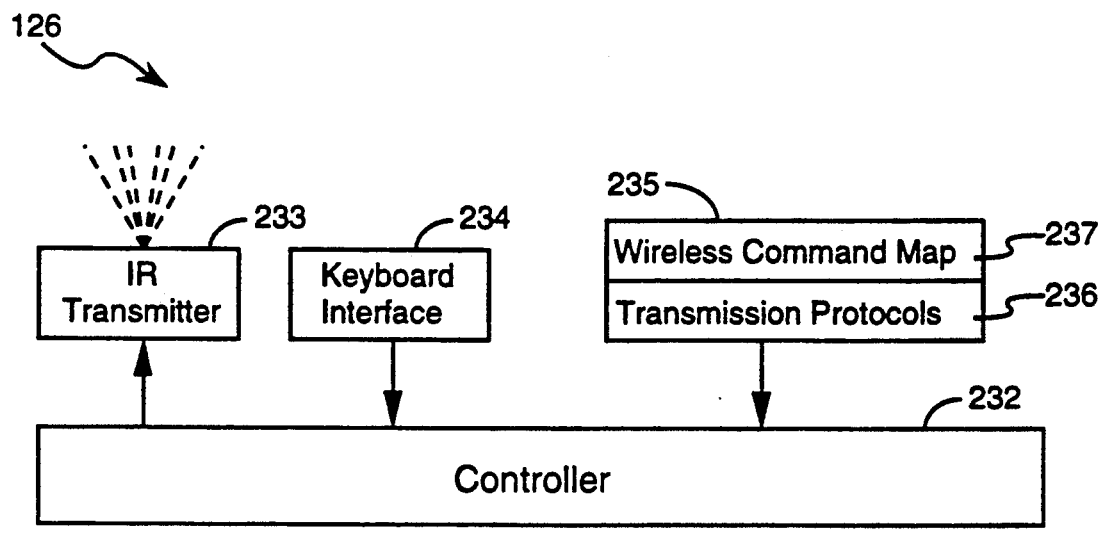
FIG. 10 is a block diagram representation of the components of the remote control device used in the preferred embodiment of the present invention.

Referring to FIG. 10, the remote control wand 126 used in the preferred embodiment is a programmable handheld infrared transmitter, similar in function to many commercially available programmable remote control wands. The wand 126 used in the preferred embodiment includes a microcontroller 232, an infrared signal transmitter 233, a keyboard interface 234, and a non-volatile EEPROM memory 235 that stores (A) a set of two transmission protocols 236 that defines the signal format (including carrier frequency and transmission protocol) for two distinct sets of commands, and (B) a wireless command map 237 that indicates the set of wireless commands to be transmitted in response to each button pressed on the keyboard interface.

A single remote control wand 126 is used to send wireless commands to both the television 120 and the converter box 104. The commands directed to the television are encoded using a distinct signal format (i.e., a distinct carrier frequency, transmission protocol, and-/or command prefix) than the signal format used for commands directed to the converter box 104.

As an example of a transmission protocol, the transmission protocol for sending commands to the converter box in the preferred embodiment is as follows: Using an IR carrier frequency of 38 KHz, before sending out a command the IR transmitter is turned on for 3.4 milliseconds, then off for 3.4 milliseconds. Then an 11-bit command code is transmitted as 22 bits, in which the first 11 bits and the last 11 bits are 1's complements. The 11-bit command includes a 5-bit prefix (01101) that is the same for all commands, and the last six bits identify the particular command. Each "1" bit is transmitted by turning the IR transmitter on for 880 microseconds and then off for 2.5 milliseconds, while each "0" bit is transmitted by turning the IR transmitter on for 880 microseconds and then off for 820 microseconds. The command is transmitted twice with an intercommand spacing of approximately 50 milliseconds.

For commands to be directed to the television 120, the remote control wand is programmed with the carrier frequency, the turn on signal sequence, and the signal format for "0" and "1" bits required for use with a specified type of television set. Thus, the wireless command protocol stored in the remote control wand 126 for sending commands to the television 120 will vary from installation to installation of the system. The wireless signal formats for virtually all commercial televisions are publicly available and can be easily programmed into the remote control wand 126. For example, the wireless command signal format used for Sony televisions that use the RM-783 model remote control is as follows. The IR carrier frequency used is 38 KHz, with each command being preceded by a "start bit" which is transmitted by turning the IR transmitter on for 2.4 milliseconds, then off for 0.6 milliseconds. Each remote command is encoded as a 12-bit command code. The 12-bit command includes a six-bit prefix (equal to 000010) that is the same for all commands, and the last six bits identify the particular command. Each "1" bit is transmitted by turning the IR transmitter on for 1.2 milliseconds and then off for 0.6 milliseconds, while each "0" bit is transmitted by turning the IR transmitter on for 0.6 milliseconds and then off for 0.6 milliseconds. The command is transmitted twice with an intercommand spacing of approximately 50 milliseconds.

At least one component of the signal format (carrier frequency, transmission protocol and command prefix) will be different for the television and converter box. The IR sensor 132 for the converter box ignores all received infrared signals that do not match the predefined carrier frequency, and the wireless command decoding software executed by the converter box's CPU 156 ignores received wireless commands that do not match the 1/0 signal transmission format and command prefix assigned to the converter box 104. Similarly, the remote command decoder 124 for the television 120 ignores all received infrared signals that do not match the predefined carrier frequency, 1/0 signal format and command prefix for that type of television.

Figure 11:
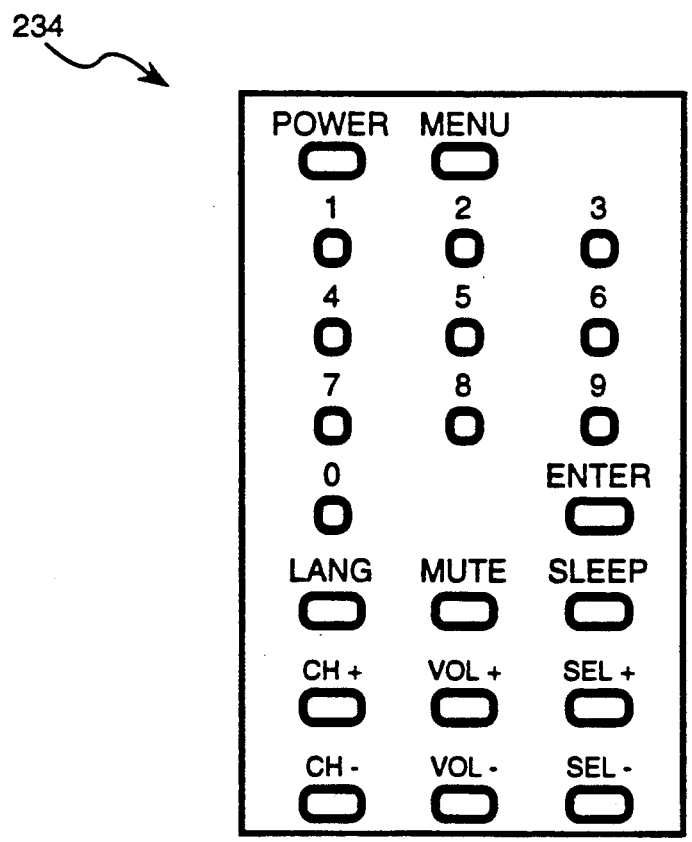
FIG. 11 is a schematic representation of the user interface of a television and converter remote control device used in the preferred embodiment of the present invention.

FIG. 11 shows an example of the pushbutton keyboard 234 for the remote control wand 126. Note that the LANG (language), MUTE, SLEEP, VOL+ and VOL−buttons are used exclusively for sending commands to the television set. The Power button, which is an on/off toggle switch, is used to send commands to "0", to both the television 120 and the converter box 104. The MENU, "1"ENTER, CH+, CH−, SEL+, SEL− and ENTER buttons are used exclusively for sending commands to the converter box 104.

Figure 12:
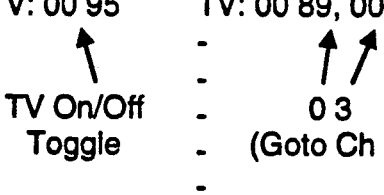
FIG. 12 is a block diagram representation of the wireless command map stored in the memory of the remote control device in the preferred embodiment of the present invention.

FIG. 12 depicts an example of the wireless command map 237 stored in the remote controller's EEPROM 235. The remote control wand can transmit up to five commands in response to each button pressed on the keyboard. Each command is specified by (A) a protocol identifier that identifies the signal transmission protocol to be used for that command, and (B) a binary command value, which includes the command prefix value and the command suffix value. In FIG. 12 the commands identified as using the "TV" protocol are wireless commands to be sent to the television and the commands identified as using the "CB" protocol are wireless commands to be sent to the converter box.

As shown in FIG. 12, only the POWER button causes the transmission of multiple commands. In particular, pressing the POWER button on the remote control wands causes the wand to transmit three commands: TV:POWER ON/OFF, TV:GOTO CHANNEL X, and CB:ON. Note that in each installation of the system "CHANNEL X" will be a specified channel, such as "CHANNEL 3". Each wireless command in this sequence is transmitted twice before the next command is transmitted.

Every time the POWER button on the wand is pressed, the television is commanded to toggle its On/-Off switch, and to tune to a predefined channel (such as channel 4). Since no other commands transmitted by the wand 126 affect the television's tuner, the television should normally be tuned to the proper channel unless the user manually tunes the television to a different channel using a channel selector on television. In addition, the "ON" command sent to the converter box prompts the converter box to check the On/Off status of the television, and to tune the converter to the "Barker" channel (such as channel 3) assigned the converter box's channel configuration map 220. Note that the signal values shown in FIG. 12 are only exemplary values.

For other television sets, the carrier frequency and signal format could be the same as for the converter box, but the command prefix component of the wireless signal format would be different and thus each device will not respond to wireless commands for the other device. In general, the converter box and television set will respond to wireless commands having different signal protocols and/or different command prefixes.

Head End Controller

Figure 13:
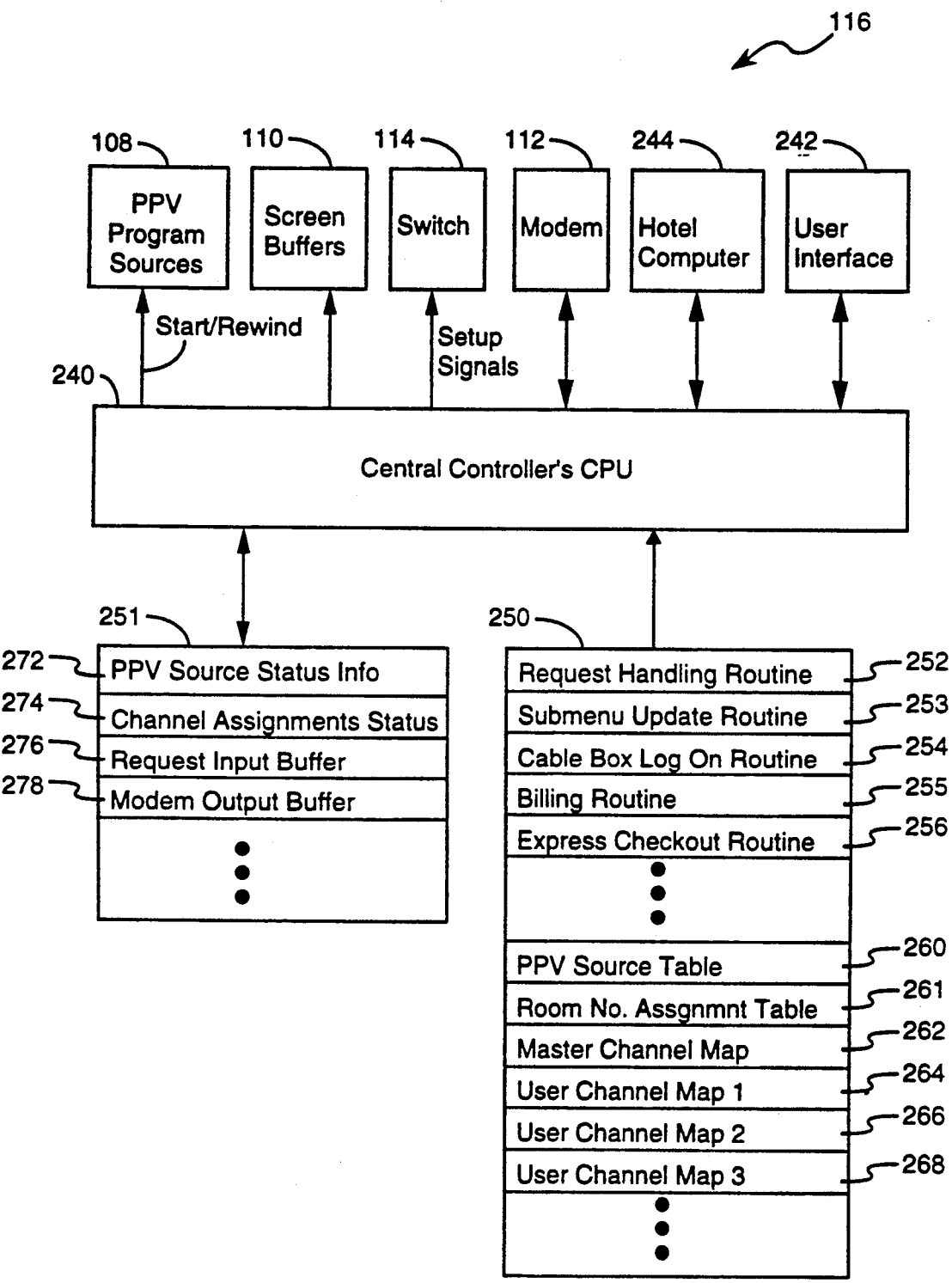
FIG. 13 is a block diagram of the controller at the head end of the preferred embodiment of a cable television system.

Referring to FIG. 13, the head end controller 116 includes a central processing unit (CPU) 240 such as an 80386 microprocessor made by Intel. The head end's CPU 240 is coupled to the system's pay-per view program sources 108, screen buffers 110, a modem 112 for communicating with the cable boxes in the system, and the program routing switch and routing circuitry 114. In addition, the head end's CPU 240 is coupled to a user interface 242 (e.g., keyboard, monitor, printer) used for such tasks as updating the list of pay-per view movies loaded in the pay-per view program sources. The CPU 240 is also to the hotel's computer 244 for exchanging billing information with the hotel's computer 244 and for allowing hotel guests to review their bill on the television screen. Finally, the head end's CPU 240 is coupled to non-volatile memory 250 (such as a hard disk) for storing software and information that needs to be retained for long periods of time, and to random access memory 251 for storing system status information and the like.

Non-volatile memory 250 is loaded with control software routines 252–256, a pay-per view source table 260, a room number assignment table 261, a master channel map 262, and a number of different user channel maps 263–265 that are to be downloaded into the various converter boxes in the system. The pay-per view source table 260 lists the titles, run times, and so on of the pay-per view program sources currently connected to the system. The room number assignment table 261 that lists all the converter boxes in the system, including the room, serial number and other relevant information for each converter box.

The master channel assignment map 262 indicates the channel type, carrier frequency, invert/non-invert status and so on for every channel to be used in the system. The user channel assignment maps 263–265 contain subsets of the master channel assignment map 262. In a hotel or other setting, it might not be appropriate to make certain premium services available at particular locations. For instance, pay-per-view programming and hotel check-out menus should not be available at the television sets in common areas such as the hotel bar, reception areas and so on. Thus, the cable television system needs to be able to accommodate different channel assignments for different television sets. It is for this reason that the system stores two or more "user channel maps" 264–266 for downloading into different ones of the converter boxes in the system.

The central controller stores, typically in random access memory 251, a table 272 indicating the current status of each pay-per view source. For instance the status of a source may be "ready" or "rewinding" or "playing, X minutes play time remaining", and so on.

A channel assignments status table 274 stored in memory 270 indicates which channels on each cable line have been assigned to which cable boxes. In particular, any of the television channels not used for continuous broadcast television programs or other continuous broadcast programming (such as a hotel information channel) are available to be assigned to cable box whose user requests any special services from the system. As will be explained in more detail below, when a user first presses the MENU button on his remote control wand, the user's cable box is assigned an unused channel that is then used to transmit to the user's cable box menus of available pay-per view programs, the pay-per view programs selected by the user, and other special service programming. After the user is finished with the pay-per view program or otherwise terminates use of the system's special services the channel previously assigned to that user is returned to the "pool" of unused channels. In some embodiments, more than cable box can share the same assigned channel if two users request the same pay-per view program, but otherwise each user's cable box is assigned a different channel whenever the user accesses the system's special services.

A portion 276 of memory 251 is also used as a request input buffer for temporarily storing received user request messages (received via modem 112), and another portion 278 of memory 251 is used as a buffer for temporarily storing messages that are to be transmitted to user cable boxes via the modem 112.

Interaction of Converter Box and Central Controller

Figure 14:
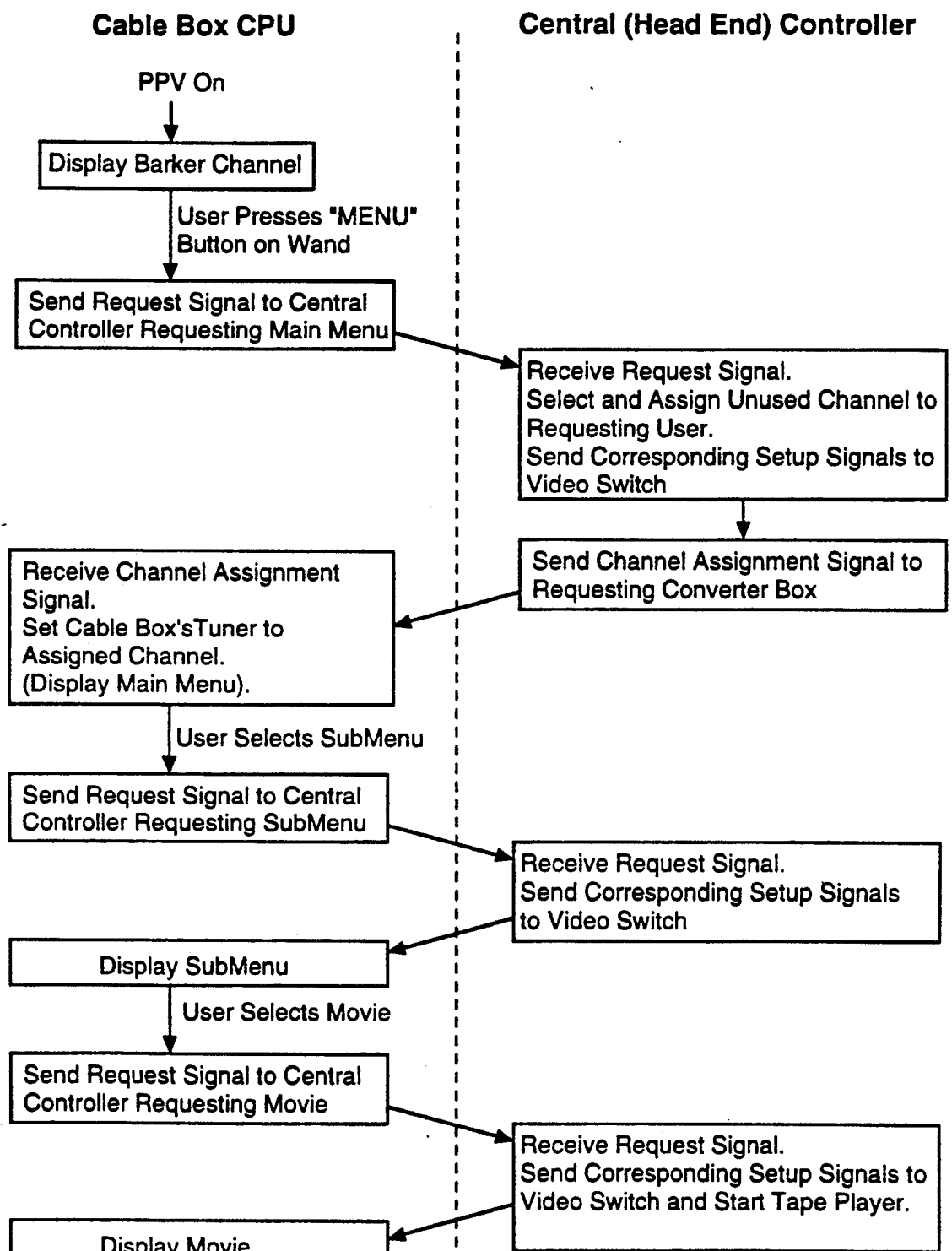
FIG. 14 is a flow chart showing how the interactions between the head end controller and one converter box's controller when a user selects a pay-per-view program.

FIGS. 14 is a flow chart showing the sequence of actions performed by the converter box's CPU 156 and the central controller 116 when a user turns on his television and selects a pay-per view program.

When the user's television is first turned on (by pressing the ON/OFF button on the remote controller) the television is tuned to a predefined channel, e.g., channel 3, and the converter box is automatically tuned to a pre-selected "barker channel" which always carries the system's "Welcome Menu". The Welcome Menu explains how to use the system. The user can select free-to-guest program channels by pressing the CH+ and CH− buttons. By pressing the MENU button on the remote controller, the user causes a sequence of actions, some performed by the converter box's CPU and some by the central controller. First, the converter box's CPU sends to the central controller a request signal identifying the converter box and requesting that the Main Menu be sent to that converter box.

The central controller 116 responds to the received request signal by first selecting an unassigned special services channel for the requesting converter box, and then sending setup signals to the video switch to put the Main Menu (i.e., one of the screen buffers) on the channel selected for the requesting converter box. In addition, the central controller sends a channel assignment signal to the requesting converter box. When the converter box's CPU 156 receives the channel assignment signal, it switches its tuner to the assigned special service channel.

To continue with the process of selecting a movie, the user must make a valid numerical entry corresponding to one of the sub-menus (e.g., movie categories) listed in the Main Menu. When a user entry is made, the converter box's CPU sends a message denoting the user's choice to the system's central controller. If the entry was a valid entry, the central controller switches the selected sub-menu (i.e., a different one of the screen buffers) onto the transmission cable and frequency band for the user's converter box, which causes the selected sub-menu to be displayed.

By making a valid entry from the sub-menu the user selects a pay-per view program. Once again the converter box's CPU sends a message denoting the user's choice to the system's central controller. The central controller then enables the selected video source (i.e., puts the selected video cassette player into play mode), and sets up the video switch so that the selected video source is switched onto the transmission cable and frequency band for the user's assigned special services channel, which causes the selected movie or program to be displayed.

Alternate Embodiments

It is noted that there are numerous television signal formats used in various countries, and thus the set of different television signal formats that a particular cable television system must handle will differ from location to location. Nevertheless, the basic organization of the multi-standard converter box of the present invention will be applicable to any such combination of television signal formats. Furthermore, it is contemplated that systems incorporating the present invention, but accommodating three or more television signal formats will be needed. In that case the converter box's CPU will need to generate more than one control signal to specify the signal format of the currently selected channel, and the number of separate signal paths for removing the audio signal from each type of television signal will generally be equal to the number of different signal formats (or the number of different audio signal frequency locations in those signal formats).

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. Cable television apparatus, comprising:
    a television signal converter including:
        a frequency channel converter that receives a multiplicity of television signals in different frequency bands and outputs any selected one of said multiplicity of television signals on a predefined frequency band;
        a first sensor for receiving wireless command signals;
        a first controller coupled to the frequency channel converter and said second sensor, said second controller responding only to a first predefined set of wireless commands, said first controller responding to wireless converter channel selection commands by selecting one of said multiplicity of television signals to be output by said frequency channel converter;
    a television having:
        an on/off switch for turning the television on and off;
        a tuner coupled to an input signal port;
        a second sensor for receiving wireless command signals;
        a second controller coupled to the on/off switch, tuner and sensor, said second controller responding only to a second predefined set of wireless commands received by said sensor that are distinct from said first predefined set of wireless commands, said second controller responding to wireless on/off commands received by said sensor by toggling said on/off switch, said controller further responding to wireless TV channel selection commands received by said sensor by sending corresponding channel selection signals to said tuner;
    a remote control transmitter including:
        a user interface for selecting user commands from a predefined set of user commands;
        a memory table storing for each command in said predefined set of user commands at least one wireless command to transmit in response to selection of said each command; and
        a transmitter coupled to said user interface and said memory table that responds to on/off user commands by transmitting said wireless on/off command signal and transmitting a predefined one of said wireless converter channel selection commands that selects a predefined one of said multiplicity of television signals to be output by said frequency channel converter; and that responds to channel selection user commands by transmitting corresponding wireless converter channel selection commands;
    whereby both said television and said television signal converter respond to wireless commands from said remote control transmitter.

2. The cable television apparatus of claim 1, wherein said first sensor for said television signal converter is positioned proximate said television so that both said first and second sensors receive the wireless commands transmitted by said remote control signal transmitter.

3. The cable television apparatus of claim 1, wherein said user interface includes volume control keys and said remote control transmitter transmits, in response to activation of said volume control keys, wireless volume control commands that are included only in said second predefined set of wireless commands.

4. The cable television apparatus of claim 1, wherein said user interface includes numeric keys and said remote control transmitter transmits, in response to activation of said numeric keys, corresponding wireless commands that are included only in said first predefined set of wireless commands.

5. The cable television apparatus of claim 1, wherein said wireless TV channel selection commands including one wireless TV channel selection command for commanding said television to tune to a predefined TV channel on said predefined frequency band; and
    said transmitter further responds to on/off user commands by transmitting said one wireless TV channel selection signal.

6. Cable television apparatus, comprising:
    a television having:
        an on/off switch for turning the television on and off;
        a tuner coupled to an input signal port;
        a first sensor for receiving wireless command signals;
        a first controller coupled to the on/off switch, tuner and sensor, said first controller responding only to wireless commands received by said sensor having a first predefined signal format, said first controller responding to wireless on/off commands received by said sensor having said first predefined signal format by toggling said on/off switch, said controller further responding to wireless TV channel selection commands received by said sensor having said first predefined signal format by sending corresponding channel selection signals to said tuner;

a television signal converter including:
  a frequency channel converter that receives a multiplicity of television signals in different frequency bands and outputs any selected one of said multiplicity of television signals on a predefined frequency band;
  a second sensor for receiving wireless command signals;
  a second controller coupled to the frequency channel converter and said second sensor, said second controller responding only to wireless commands received by said second sensor having a second predefined signal format which is distinct from said first predefined signal format, said second controller responding to wireless converter channel selection commands having said second predefined signal format by selecting one of said multiplicity of television signals to be output by said frequency channel converter; and a remote control transmitter including:
  a user interface for selecting user commands from a predefined set of user commands;
  a memory table storing for each command in said predefined set of user commands at least one wireless command to transmit in response to selection of said each command, said memory table storing, for each wireless command, data representing (A) which of said first and second signal formats to use when transmitting said wireless command and (B) said wireless command; and
  a transmitter coupled to said user interface and said memory table that responds to on/off user commands by transmitting said wireless on/off command signal having said first predefined signal format and transmitting a predefined one of said wireless converter channel selection commands having said second predefined signal format so as to select a predefined one of said multiplicity of television signals to be output by said frequency channel converter; and that responds to channel selection user commands by transmitting corresponding wireless converter channel selection commands having said second predefined signal format;

whereby both said television and said television signal converter respond to wireless commands from said remote control transmitter.

7. The cable television apparatus of claim 6, wherein said wireless TV channel selection commands including one wireless TV channel selection command having said first predefined signal format for commanding said television to tune to a predefined TV channel on said predefined frequency band; and
said transmitter further responds to on/off user commands by transmitting said one wireless TV channel selection signal.

8. The cable television apparatus of claim 6, wherein said sensor for said television signal converter is positioned proximate said television so that both sensors receive the wireless commands transmitted by said remote control signal transmitter.

9. The cable television apparatus of claim 6, wherein said user interface includes volume control keys and said remote control transmitter transmits volume control commands, in response to activation of said volume control keys, having said first predefined signal format for use only by said television.

10. The cable television apparatus of claim 6, wherein said user interface includes numeric keys and said remote control transmitter transmits, in response to activation of said numeric keys, corresponding commands having said first predefined signal format for use only by said television.

* * * * *